Figure 1:
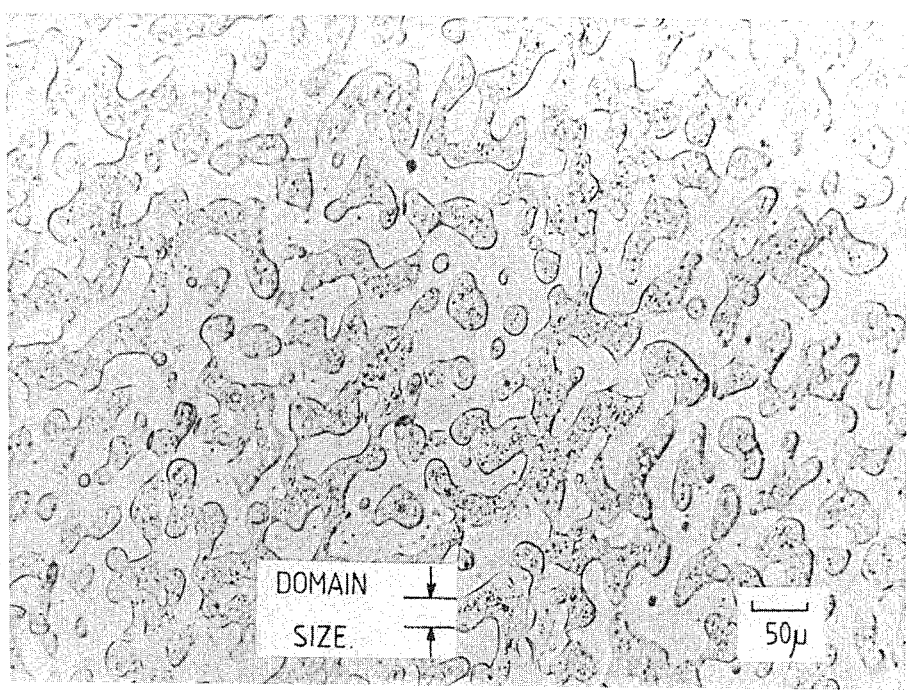

United States Patent [19]
Brody et al.

[11] Patent Number: 4,822,678
[45] Date of Patent: Apr. 18, 1989

[54] FIBERS AND HOLLOW FIBROUS TUBES

[75] Inventors: Harry Brody, Harrogate; Colin A. Dewar, Hucclecote; Nigel W. Hayman, Cheltenham, all of England

[73] Assignee: Imperial Chemical Industries PLC, London, United Kingdom

[21] Appl. No.: 42,231

[22] Filed: Apr. 24, 1987

[30] Foreign Application Priority Data

May 16, 1986 [GB] United Kingdom ............... 8611974
Jan. 7, 1987 [GB] United Kingdom ............... 8700247

[51] Int. Cl.$^4$ ............................................. D02G 3/00
[52] U.S. Cl. .................................. 428/373; 428/36.4; 428/364; 428/398; 428/224; 428/374
[58] Field of Search ............... 428/364, 373, 376, 398, 428/35, 36, 374; 524/505; 521/905; 528/60, 61, 904; 264/24, 26

[56] References Cited

U.S. PATENT DOCUMENTS

| | | | |
|---|---|---|---|
| 3,968,307 | 7/1976 | Matsui et al. | 428/374 X |
| 4,041,103 | 8/1977 | Davison et al. | 525/92 |
| 4,081,424 | 3/1978 | Gergen et al. | 524/505 |
| 4,110,303 | 8/1978 | Gergen et al. | 524/505 |
| 4,119,607 | 10/1978 | Gergen et al. | 524/505 |
| 4,611,025 | 9/1986 | Akkapeddi et al. | 524/451 X |

FOREIGN PATENT DOCUMENTS

0080274 6/1983 European Pat. Off.
1309295 3/1973 United Kingdom.

OTHER PUBLICATIONS

Bryce Maxwell and Guillermo L. Jasso, "The Stability of Blends of Incompatible Thermoplastics", *Polymer Engineering and Science*, mid-Aug., 1983, vol. 23, No. 11, pp. 614–617.

*Primary Examiner*—Lorraine T. Kendell
*Attorney, Agent, or Firm*—Cushman, Darby & Cushman

[57] ABSTRACT

A melt spun fiber or tube having two polymeric fibrous components and containing from 30 to 70 parts by weight of a first component and from 70 to 30 parts by weight of a second component, each component being present in the fiber or wall of the tube as fibrils which are substantially aligned to the axis of the fiber or tube the aligned fibrils being interconnected to each other in a random manner, the interconnections penetrating through the fibrils of the other component such that both components exist in the fiber or tube wall as interpenetrating networks.

2 Claims, 2 Drawing Sheets

FIBERS AND HOLLOW FIBROUS TUBES

This invention relates to bicomponent fibres and tubes and porous fibres and tubes having a porous wall produced therefrom.

Bicomponent heterofilament fibres are well known. In such fibres, the heterofilament usually have either a core/sheath or a side by side disposition.

In European Pat. No. 0080274 we describe a bicomponent fibre produced from a blend of a fibre-forming polymer and from 0.1% to 10% by weight of another, immiscible, polymer and in which, in the fibre, the immiscible polymer exists in the form of unconnected microfibrils which are dispersed in the continuous matrix of the fibre-forming polymer.

In Polymer Engineering and Science, Mid-August, 1983, Vol. 23, No. 11, there is described the work by Bryce Maxwell and Guillermo L Jasso of the Department of Chemical Engineering, Princeton University on the "Stability of Blends of Incompatible Thermoplastics". More particularly it describes the extrusion of blends of poly(methylmethacrylate) and polyethylene. The extrudate so formed consists of two continuous interpenetrating phases corresponding to the two polymers. The separate phases in the extrudate are referred to as three dimensional continuous cobwebs. It is quite apparent from the Figures (two of which are photographs) provided with the article that the fibrils forming the cobwebs are arranged quite randomly without any suggestion of alignment of the fibrils.

According to the present invention we provide a melt spun fibre or tube having two polymeric fibrous components and containing from 30 to 70 parts by weight of a first component and from 70 to 30 parts by weight of a second component, each component being present in the fibre or wall of the tube as fibrils which are substantially aligned to the axis of the fibre or tube the aligned fibrils being interconnected to each other in a random manner, the interconnections penetrating through the fibrils of the other component such that both components exist in the fibre or tube wall as interpenetrating networks.

Optionally the spun fibres of the invention can be drawn by conventional techniques.

We have found that such novel fibres or tubes can be produced from a blend of the first component and the second component by a conventional melt spinning process.

The structure of the blend at spinning was determined by examination of the extrudate immediately upon exit from the spinneret. This was sectioned and examined under the microscope. Usually melt blends of two immiscible polymers produce a two phase system where one polymer forms the continuous phase and the other the discontinuous phase, which appears as globules in the extrudate. When the fibre or tube is spun the globules, if they have a suitable viscosity, deform into individual fibrils which are not connected to each other.

For certain blend compositions and spinning conditions we have found that an interpenetrating network (IPN) of the two components can be formed, as shown in the extrudate section in FIG. 1 (see Example 1—Run 5 below) where both phases (components) are co-continuous. Each component is in the form of a three dimensional network which interlocks with the other component network. In the spun fibre or tube this mutual interlocking is maintained, each component being present in the fibre or tube wall as oriented fibrils which are substantially aligned to the axis of the fibre or tube such aligned fibrils being interconnected to each other in a random manner, such interconnections penetrating through the fibrils of the other component.

To produce such a fibre or tube two conditions are necessary: (1) the blend must form an IPN and (2) this IPN must be spinnable by which we mean that the fibre or tube produced therefrom is capable of being wound up. There is only a limited range of conditions for a particular two component system where an IPN can be formed and, moreover, even when operating within that range of conditions the two component system may not always be spinnable. When the blend is unspinnable the threadline or tubular melt breaks continuously on withdrawal from the spinneret.

A critical condition for the formation of an IPN is a high degree of shear, mainly controlled by the passage through the spinneret and therefore dependent on the spinneret orifice diameter and shape. Another factor is the relative concentration of the two polymers. These should most favourably be fairly equal in proportion.

Spinnability of the IPN also depends on the 'domain size', the characteristic dimension of the phase thickness, as shown in FIG. 1, and the viscosity of each polymer. In general the higher the domain size the poorer the spinnability, but this can be compensated for by lowering the viscosity of one of the components, as is shown with polypropylene in Example 1 below. However, if the domain size is too large this may not be possible. A major factor controlling the domain size is the presence in the blend of a 'compatibiliser' which serves to reduce the interfacial surface tension between the polymers so that for the same amount of shear applied to the blend, a smaller domain size is produced than if a compatibiliser was not present. For blends of polypropylene and nylon 66 we have found that RILSAN, a nylon 11 polymer manufactured by Rhone-Poulenc, is a suitable compatibiliser. For other polymers, of course, a different or no compatibiliser may be required.

According to the method of the invention, therefore, a blend of a first fibre-forming polymer and a second, immiscible, fibre-forming polymer and containing from 30 to 70 parts by weight of the first polymer and from 70 to 30 parts by weight of the second polymer is spun under those conditions of shear and domain size which results in each polymer being present in the fibre or tube wall as fibrils which are substantially aligned to the axis of the fibre or tube, such aligned fibrils being interconnected to each other in a random manner, such interconnections penetrating through the fibrils such that both polymers exist in the fibre or tube wall as interpenetrating networks.

The influence of the various factors which contribute to the spinning of the novel fibres of the invention is demonstrated by the following examples.

EXAMPLE 1

In this example, nylon 66, polypropylene and nylon 11 were used. The nylon 66 was grade SG (relative viscosity 40) manufactured by Imperial Chemical Industries PLC. The polypropylene was manufactured by Imperial Chemical Industries PLC. Various samples having a different melt flow index (MFI) were used. Nylon 11, a compatibiliser, was RILSAN manufactured by Rhone-Poulenc.

The MFI is a measure of the melt viscosity (of polypropylene), the lower the MFI, the higher the viscosity. It was measured at 230° C. under a load of 2.16 kg. The nylon 66 was dried at 80° C. for 16 hours before spinning.

A chip blend of the polymers was spun on a conventional extruder-fed melt spinner at a throughput of 54 grams per hole per hour with no deliberate quenching. The wind up speed was 500 mpm.

The results obtained are given in Table 1. Runs 1 and 2 show that even using a compatibiliser, if the spinneret orifice is not small enough to give a high shear rate, an IPN is not formed and the blend is unspinnable.

Figure 2:
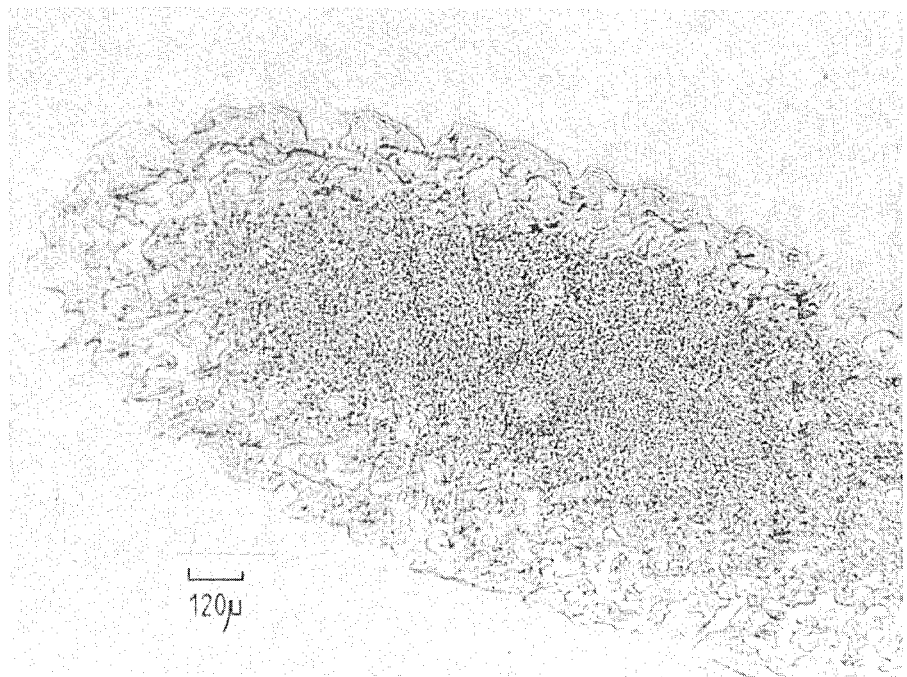

Runs 3 and 4 show that when the spinneret diameter was reduced, the shear rate at the wall thereof, which is higher than anywhere across the cross section of the extrudate, is now high enough to form an IPN on the outside of the extrudate, but not at the centre of the extrudate, as shown in FIG. 2. Under these conditions, the blend was still not spinnable.

Finally, in Run 5, further reduction of the spinneret orifice diameter produced an IPN (see FIG. 1) which was spinnable.

Runs 5, 6 and 7 show the effect of the compatibiliser. As the amount is reduced the domain size gets larger, and eventually even though an IPN is formed, the threadline becomes unspinnable.

The effect of the polypropylene viscosity on the shear rate is shown by Run 8. Even though the spinneret orifice diameter is relatively large an IPN with a small domain size was produced. However, it was unspinnable because the viscosity of the polypropylene was too high. The same geometry of IPN in Run 9, using a lower viscosity polypropylene was also unspinnable for the same reason. Further lowering of the polypropylene viscosity in Runs 10 and 11 finally led to spinnability again, even though the domain size was now larger.

However, for large domain sizes obtained by using no compatibiliser, as in Run 12, or very low polypropylene viscosity, as in Run 13, spinnability was not possible.

Runs 14 and 15 show that a spinnable IPN can be formed with 33.6% by weight of polypropylene but not with 9.8% by weight of polypropylene.

A feature of the bicomponent fibres and bicomponent fibre tubes of the invention is that either of the components can be leached out using a suitable solvent so producing a low density fibre or tube of the other component. Surprisingly the remaining component retains its fibrous integrity.

According to one aspect of the invention, therefor, we provide a melt spun fibre of a fibre-forming polymer comprising spaced fibrils of the polymer which are substantially aligned to the longitudinal axis of the fibre, such aligned, spaced fibrils being interconnected to each other in a random manner.

According to another aspect of the invention we provide a melt spun tube of a fibre-forming polymer, the wall of which has a structure comprising spaced fibrils of the polymer which are substantially aligned to the axis of the tube, such aligned spaced fibrils being interconnected to each other in a random manner.

If desired two component fibres according to the invention may be woven or knitted into a fabric and then one of the component fibres removed by immersing the fabric in a solvent for that component fibre.

To demonstrate that one of the two components of an IPN fibre can be removed and still leave a coherent fibre the following experiment was carried out as Example 2.

EXAMPLE 2

In this example the blend composition was 39.2% by weight of polypropylene (MFI 20 ) 58.8% by weight of nylon 66 (S G Grade) and 2% by weight of nylon 11 (RILSAN). A spinnable IPN was produced. The throughput per hole was 60 grams/min and the wind-up speed was 500 mpm.

A sample of the spun fibre was immersed in 90% formic acid at room temperature to dissolve nylon 66, washed in water and dried for 16 hours at room temperature. The amount of nylon 66 removed was 45.2%.

A further sample of the spun fibre was drawn, at a draw ratio of 2.5, using a hot pin at 80° C. and a draw speed of 30 mpm. The weight loss after further formic acid treatment of this drawn fibre was now 56.4% by weight.

The following tensile properties were obtained on an Instron:

TABLE 1

| RUN NO | SPINNERET ORIFICE DIAMETER (THOU) | MFI | % WT FRACTIONS POLY-PROPYLENE | NYLON 66 | NYLON 11 | IPN FORMATION | DOMAIN SIZE (μ) | SPINN-ABILITY |
|---|---|---|---|---|---|---|---|---|
| 1 | 25 | 20 | 38.4 | 57.6 | 4 | No | — | No |
| 2 | 25 | 11 | 38.4 | 57.6 | 4 | No | — | No |
| 3 | 15 | 11 | 33.6 | 62.4 | 4 | Partly | 30 | No |
| 4 | 15 | 11 | 43.2 | 52.8 | 4 | Partly | 30 | No |
| 5 | 9 | 11 | 43.2 | 52.8 | 4 | Yes | 20 | Yes |
| 6 | 9 | 11 | 44.1 | 53.9 | 2 | Yes | 35 | Difficult |
| 7 | 9 | 11 | 45.0 | 55.0 | 0 | Yes | 65 | No |
| 8 | 25 | 1.5 | 35.0 | 61.0 | 4 | Yes | 15 | No |
| 9 | 9 | 4.5 | 43.2 | 52.8 | 4 | Yes | 15 | No |
| 10 | 9 | 20 | 43.2 | 52.8 | 4 | Yes | 50 | Yes |
| 11 | 9 | 35 | 43.2 | 52.8 | 4 | Yes | 50 | Yes |
| 12 | 9 | 35 | 45.0 | 55.0 | 0 | Yes | 120 | No |
| 13 | 9 | 90 | 43.0 | 53.0 | 4 | Yes | 250 | No |
| 14 | 9 | 11 | 33.6 | 62.4 | 4 | Yes | 15 | Yes |
| 15 | 9 | 11 | 9.8 | 88.2 | 2 | No | — | No |

|  | SPUN | | DRAWN | |
|---|---|---|---|---|
|  | Tenacity (cN/Tex) | Extension % | Tenacity (cN/Tex) | Extension % |
| Before Formic Acid | 3.4 | 145 | 12.0 | 9.5 |

|  | SPUN | | DRAWN | |
| --- | --- | --- | --- | --- |
|  | Tenacity (cN/Tex) | Extension % | Tenacity (cN/Tex) | Extension % |
| After Formic Acid | 2.1 | 235 | 8.8 | 175 |

Figure 3:

This shows that after removal of the nylon 66, the polypropylene fibrils still form a continuous fibre. Both leached samples had a higher extension than the two component parent fibre because the extension of the latter was limited by the presence of nylon 66. A scanning electron microscope photograph of the spun fibre after formic acid extraction is shown in FIG. 3.

EXAMPLE 3

In this example the blend composition was 43% by weight of polypropylene (melt viscosity 580 poise at 284° C.), 53% by weight of nylon 66 (melt viscosity 800 poise at 284° C.) and 4% of nylon 11 (RILSAN—melt viscosity 500 poise at 284° C.) as compatibiliser. Before the blend was formed the nylon 66 and nylon 11 were both dried for 16 hours under vacuum at 80° C.

The blend was spun at a temperature of 282° C., with a throughput of 4.4 grams/minute, through a spinneret having an orifice in the shape of a double C (one C being inverted with respect to the other—the orifice had a width of 100μ) and the legs of the C's were spaced by 250μ). In the spinning chimney (using an air quench) the two C-shaped melts coalesced together to form a tube having an internal diameter of approximately 1 mm. The tube was wound up at 17.5 meters/minute.

Longitudinal and transverse sections through the wall of the tube showed that the nylon 66 and polypropylene components are present in the wall as fibrils which are substantially aligned to the axis of the tube, the aligned fibrils being interconnected to each other in a random manner, the interconnections penetrating through the fibrils of the other component such that both components exist in the tube wall as interpenetrating networks.

Samples of the tube were immersed, with agitation, in 98% formic acid for 2½ hours. This served to remove approximately 95% of the nylon (66 and 11) from the wall of the tube which now comprised spaced fibrils of polypropylene which are substantially aligned to the axis of the tube, such aligned, spaced fibrils being interconnected to each other in a random manner.

In the above examples, the principle components used are polypropylene and nylon 66, however, it should be understood that other fibre-forming polymer combinations might equally well have been used selected from such fibre-forming polymers as polyethylene terephthalate, nylon 66, polyethylene, polypropylene or polyethylene glycol. Furthermore, though for convenience we have described the invention in terms of two components, it should be understood that the fibres and tubes of the invention can be produced from more than two components without departing from the spirit of the invention. Also where a third or more component is used such component(s) may be fibrillar or non-fibrillar.

Because of their novel appearance, the fibres of the invention may be used in the construction of those woven or knitted fabrics where aesthetic appeal is desirable. Also, because they have a highly porous structure, the fibres and tubes of the invention can be used in the construction of separation media or for the immobilisation of chemical particles within the pores in the fibres or tube walls.

We claim:

1. A melt spun fibre having two polymeric fibrous components and containing from 30 to 70 parts by weight of a first component which is nylon 66, from 70 to 30 parts by weight of a second component which is polypropylene compatibilizer present in an amount sufficient to reduce the interfacial surface tension between the nylon 66 and polypropylene, each component being present in the fibre as fibrils which are substantially aligned to the axis of the fibre, the aligned fibrils being interconnected to each other in a random manner, the interconnections penetrating through the fibrils of the other component such that both components exist in the fibre as interpenetrating networks.

2. A melt spun fibre as claimed in claim 1, wherein said compatibilizer is nylon 11.

* * * * *

UNITED STATES PATENT AND TRADEMARK OFFICE
CERTIFICATE OF CORRECTION

PATENT NO. : 4,822,678

DATED : April 18, 1989

INVENTOR(S) : BRODY et al.

It is certified that error appears in the above-identified patent and that said Letters Patent is hereby corrected as shown below:

Column 6, line 33, following "polypropylene" insert --, a--.

Signed and Sealed this

Twenty-sixth Day of February, 1991

Attest:

HARRY F. MANBECK, JR.

Attesting Officer

Commissioner of Patents and Trademarks